US012625048B2

(12) United States Patent
Bando et al.

(10) Patent No.: US 12,625,048 B2
(45) Date of Patent: May 12, 2026

(54) BROWNIAN MOTION CORRECTION METHOD FOR PARTICLE MEASUREMENT

(71) Applicant: RION CO., LTD., Tokyo (JP)

(72) Inventors: Kazuna Bando, Tokyo (JP); Kaoru Kondo, Tokyo (JP); Takuya Tabuchi, Tokyo (JP); Sota Kondo, Tokyo (JP)

(73) Assignee: RION CO., LTD., Kokubunji (JP)

( * ) Notice: Subject to any disclaimer, the term of this patent is extended or adjusted under 35 U.S.C. 154(b) by 639 days.

(21) Appl. No.: 17/642,920

(22) PCT Filed: Mar. 3, 2021

(86) PCT No.: PCT/JP2021/008302
§ 371 (c)(1),
(2) Date: Mar. 14, 2022

(87) PCT Pub. No.: WO2021/187122
PCT Pub. Date: Sep. 23, 2021

(65) Prior Publication Data
US 2022/0364970 A1     Nov. 17, 2022

(30) Foreign Application Priority Data
Mar. 17, 2020     (JP) ................................. 2020-046243

(51) Int. Cl.
*G01N 15/0227*     (2024.01)
*G01N 15/0205*     (2024.01)
*G01N 15/10*       (2024.01)
(52) U.S. Cl.
CPC ..... *G01N 15/0227* (2013.01); *G01N 15/0211* (2013.01); *G01N 2015/025* (2013.01)
(58) Field of Classification Search
CPC ........... G01N 15/0227; G01N 15/0211; G01N 2015/025
See application file for complete search history.

(56) References Cited

U.S. PATENT DOCUMENTS

2013/0018256 A1*  1/2013  Kislev .................... A61B 1/043
                                                          600/431
2017/0160185 A1   6/2017  Minemura et al.
                        (Continued)

FOREIGN PATENT DOCUMENTS

| EP | 3611492 A1 | 2/2020 |
|----|------------|--------|
| EP | 4365569 | * 11/2022 |
| JP | 6549747 B2 | 7/2019 |

OTHER PUBLICATIONS

Patent Cooperation Treaty, International Search Report, Application No. PCT/JP2021/008302, dated Apr. 22, 2021, in 5 pages.
(Continued)

*Primary Examiner* — Rebecca C Bryant

(74) *Attorney, Agent, or Firm* — PROCOPIO, CORY, HARGREAVES & SAVITCH LLP

(57)     ABSTRACT

A flow passage is irradiated with irradiation light, and light scattered from a particle contained in a sample passing through a detection region that is formed in a prescribed section is condensed at a position obtained by extending the prescribed section in a flow direction of the sample and captured at a prescribed frame rate. Then movement amount of the particle due to Brownian motion in directions perpendicular to the flow direction on the basis of captured plural frame images. Furthermore, a particle size of the particle is determined by correcting the movement amount using correction values that were obtained in advance corresponding to each of defocus positions for correcting errors of movement amount in the images caused by magnification.

4 Claims, 13 Drawing Sheets

(56)        References Cited

U.S. PATENT DOCUMENTS

2020/0064169 A1*   2/2020   Kato ....................... G01F 1/661
2020/0124514 A1*   4/2020   Kondo .............. G01N 15/1433

OTHER PUBLICATIONS

Patent Cooperation Treaty, WOSA, Application No. PCT/JP2021/008302, dated Apr. 22, 2021, in 3 pages.

European Patent Office, Extended European Search Report, Application No. 21770643.1, dated Mar. 14, 2024, in 9 pages.

Korean Patent Office, Office Action, Application No. 10-2022-7008207 on Jul. 3, 2025, in 7 pages.

Chinese Patent Office, Office Action, Application No. 202180005328.0, on Jun. 9, 2025, in 16 pages.

Taiwan Patent Office, Office Action, Application No. 110109097, dated Feb. 24, 2025, in 6 pages.

* cited by examiner

*FIG. 9B*

CORRECTION VALUES
IN X DIRECTION

| AREA | RANGE IN X DIRECTION (px) | CORRECTION VALUE (µm/s) |
|---|---|---|
| 1 | 1 ∼ 244 | −3.359493 |
| 2 | 245 ∼ 489 | −2.627385 |
| 3 | 490 ∼ 734 | −1.884132 |
| 4 | 735 ∼ 979 | −1.133363 |
| 5 | 980 ∼ 1224 | −0.37826 |
| 6 | 1225 ∼ 1469 | 0.37826 |
| 7 | 1470 ∼ 1714 | 1.133363 |
| 8 | 1715 ∼ 1959 | 1.884132 |
| 9 | 1960 ∼ 2204 | 2.627385 |
| 10 | 2205 ∼ 2448 | 3.359493 |

*FIG. 10B*

CORRECTION VALUES
IN Z DIRECTION

| AREA | RANGE IN Z DIRECTION (px) | CORRECTION VALUE (μm/s) |
|------|---------------------------|-------------------------|
| 1 | 1 ∼ 244 | −3.359493 |
| 2 | 245 ∼ 489 | −2.627385 |
| 3 | 490 ∼ 734 | −1.884132 |
| 4 | 735 ∼ 979 | −1.133363 |
| 5 | 980 ∼ 1224 | −0.37826 |
| 6 | 1225 ∼ 1469 | 0.37826 |
| 7 | 1470 ∼ 1714 | 1.133363 |
| 8 | 1715 ∼ 1959 | 1.884132 |
| 9 | 1960 ∼ 2204 | 2.627385 |
| 10 | 2205 ∼ 2448 | 3.359493 |

BROWNIAN MOTION CORRECTION METHOD FOR PARTICLE MEASUREMENT

CROSS-REFERENCE TO RELATED APPLICATIONS

This application is US National Stage of International Patent Application PCT/JP2021/008302, filed Mar. 3, 2020, which claims benefit of priority from Japanese Patent Application JP2020-046243, filed Mar. 17, 2020, the contents of both of which are incorporated herein by reference.

TECHNICAL FIELD

The present invention relates to a particle measuring device and particle measuring method.

BACKGROUND ART

An FPT (flow particle tracking) method is known as one technique for obtaining a size of a particle floating in a sample. The use of the FPT method makes it possible to observe a movement of a particle by capturing light scattered from the particle by irradiating a sample with light and to measure a size, close to its geometrical size, of the particle from movement amount of the particle due to Brownian motion. Furthermore, for example, a refractive index of the particle can also be obtained by measuring light scattering intensity at the same time. As such, the FPT method is particularly useful for, for example, control of contaminating particles in semiconductor manufacturing processes.

Known as devices using the FPT method ("FPT device") is a device in which a condensing optical system consisting of lenses etc. is disposed at such a position as to be opposed to a sample flow direction (refer to Patent Literature 1, for example). The sample flow direction is, in other words, a direction in which a particle is transported by a sample flow. In this FPT device, since a condensing optical system is disposed at such a position as to be opposed to the sample flow direction, a movement of a particle caused by the sample flow is not observed from the condensing optical system, and only a movement of the particle due to its Brownian motion is observed.

CITATION LIST

Patent Literature

Patent Literature 1: Japanese Patent No. 6,549,747

SUMMARY OF INVENTION

Technical Problem

Incidentally, in the FPT method, since a particle size is calculated from the Stokes-Einstein equation with using movement amount of the particle due to Brownian motion, and viscosity and a temperature of the sample, obtaining movement amount of the particle correctly is important for accurate measurement of a particle size. Since movement amount of the particle are obtained by determining a movement amount of the centroid of the particle between the frames from positions of the centroid of the particle in respective frame images constituting a captured moving image, an error of the magnification of the condensing optical system leads to an error of a movement amount of the particle.

In FPT devices, it is necessary to set large number of apertures of lenses constituting the condensing optical system, and it is necessary to set large angle of view of the lenses. However, it is difficult for a highly accurate telecentric optical system to satisfy these requirements. Each frame image is captured with a magnification error due to defocusing and hence a particle is captured with different magnification values at respective positions in a sample flow direction. Furthermore, even if a particle is moving parallel with the sample flow direction, the particle is captured as if it were moving outward away from the center in a plane that is perpendicular to the sample flow direction due to magnification changes caused with defocus positions. As a result, movement amount of the particle obtained on the basis of captured frame images in this manner and a calculated particle size from the movement amount of the particle and other factors are necessarily affected by optical errors of the condensing optical system. The optical errors of the condensing optical system are therefore a problem to be solved for the purpose of measuring a particle size with high accuracy.

An object of the present invention is to provide a technique for measuring a particle size with high accuracy.

Solution to Problem

In order to solve the foregoing problem, the present invention employs a particle measuring device and a particle measuring method described below. It is noted that words that are parenthesized below are just examples etc. and the present invention is not limited to them.

That is, in a particle measuring device and a particle measuring method according to the present invention, a flow passage is irradiated with irradiation light and light scattered from a particle contained in a sample passing through a detection region that is formed in a prescribed section of a flow passage is condensed at a position obtained by extending the prescribed section in a flow direction of the sample and captured at a prescribed frame rate. Then movement amount of the particle due to Brownian motion in two-dimensional directions (i.e., directions perpendicular to the flow direction) on the basis of captured plural frame images. Furthermore, the movement amount is corrected using correction values that were obtained in advance corresponding to each of defocus positions for correcting a magnification error to occur in condensing the scattered light, and a particle size of the particle is determined on the basis of the corrected movement amount.

In FPT devices, in the case where light scattered from a particle contained in a sample is condensed at a position obtained by extending a prescribed section of a flow passage in a flow direction of the sample (i.e., a position opposed to a flow of the sample) and captured, a magnification error occurs due to defocusing at the of condensing the scattered light and the particle is captured in frame images with different magnification values depending on the position in the sample flow direction. Movement amount of the particle due to Brownian motion that are calculated on the basis of captured frame images in this manner include an error. Thus, if a particle size of the particle is determined on the basis of the calculated movement amount, errors included in the movement amount affect even the particle size. As a result, the particle size cannot be measured with high accuracy.

In contrast, in this aspect, calculated movement amounts are corrected using correction values that were obtained in advance corresponding to each of defocus positions for correcting a magnification error to occur in condensing the scattered light and a particle size of the particle is determined on the basis of the corrected movement amount. As a result, according to this aspect, since the magnification error due to defocusing is corrected, movement amount of the particle can be obtained more correctly and a particle size can be measured with high accuracy.

Preferably, in the above particle measuring device and particle measuring method, values that are expressed in a unit of velocity are used as the correction values. More specifically values indicating errors of movement amount per unit time that were calculated in advance on the basis of the defocus positions and positions in the frame images are used.

In this aspect, the correction values to be used for correction of the calculated movement amount are expressed in a unit of velocity, that is, errors of movement amount per unit time. As a result, movement amount can be corrected using the same calculation equation even in a case of performing a particle measurement with changing the capturing frame rate.

Furthermore, preferably, in some of the above particle measuring devices and some of the above particle measuring methods, values that were obtained in advance with an assumption that the magnification changes caused with defocus positions are expressed as a linear function of the distance in the flow direction of the sample are used as the correction values.

In this aspect, the correction values used for correction of movement amount are values that were obtained as the magnification changes caused with defocus positions in advance using a linear function of the distance in the flow direction of the sample. As a result, according to this aspect, correction can be made in such a manner that errors corresponding to a fixed interval of defocusing are fixed values irrespective of the defocus position.

Advantageous Effect of Invention

As described above, the present invention can measure a particle size with high accuracy.

4

Figure 8:
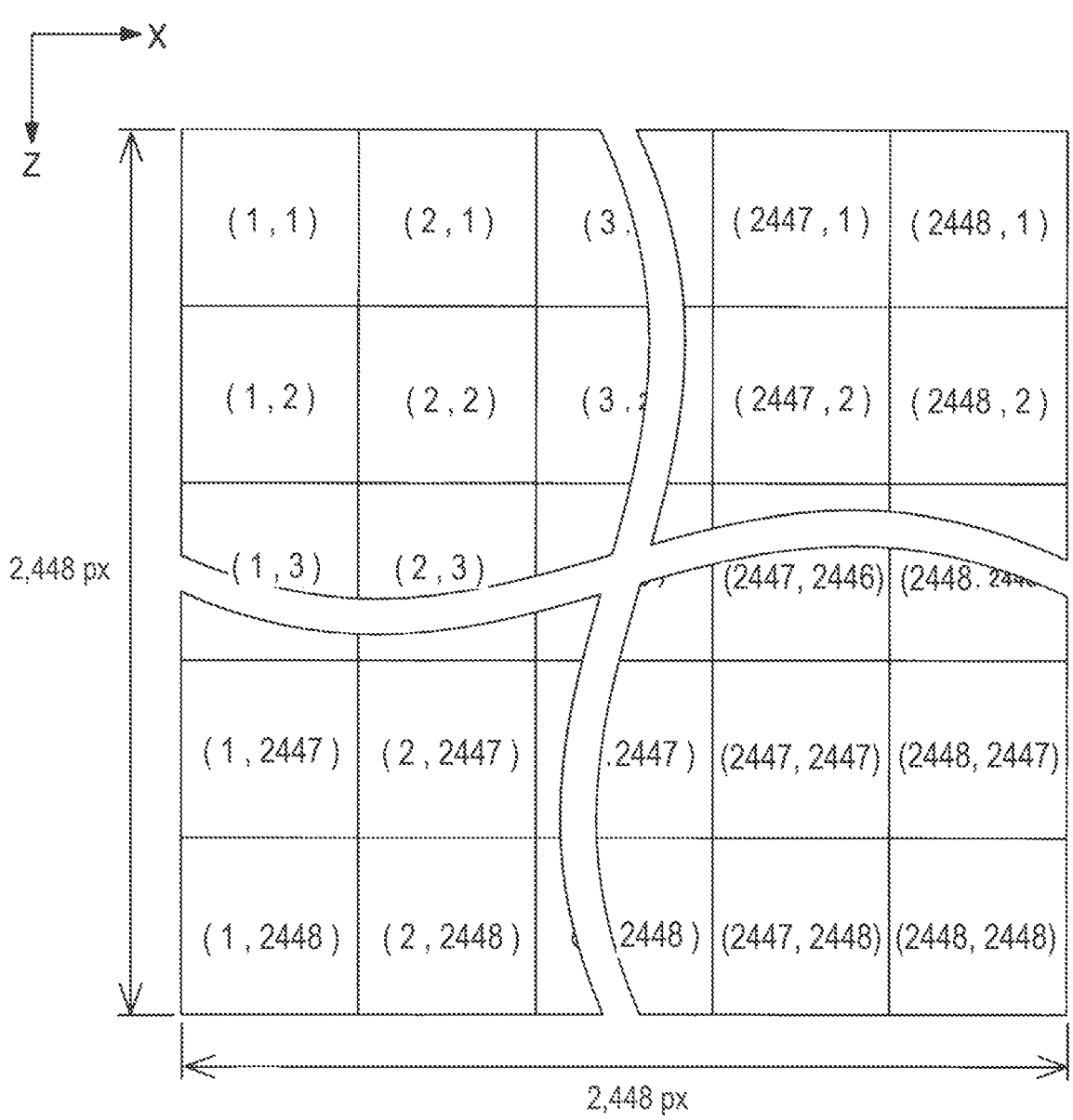

FIG. 8 is a diagram showing pixels on a light receiving surface.

Figure 9A:
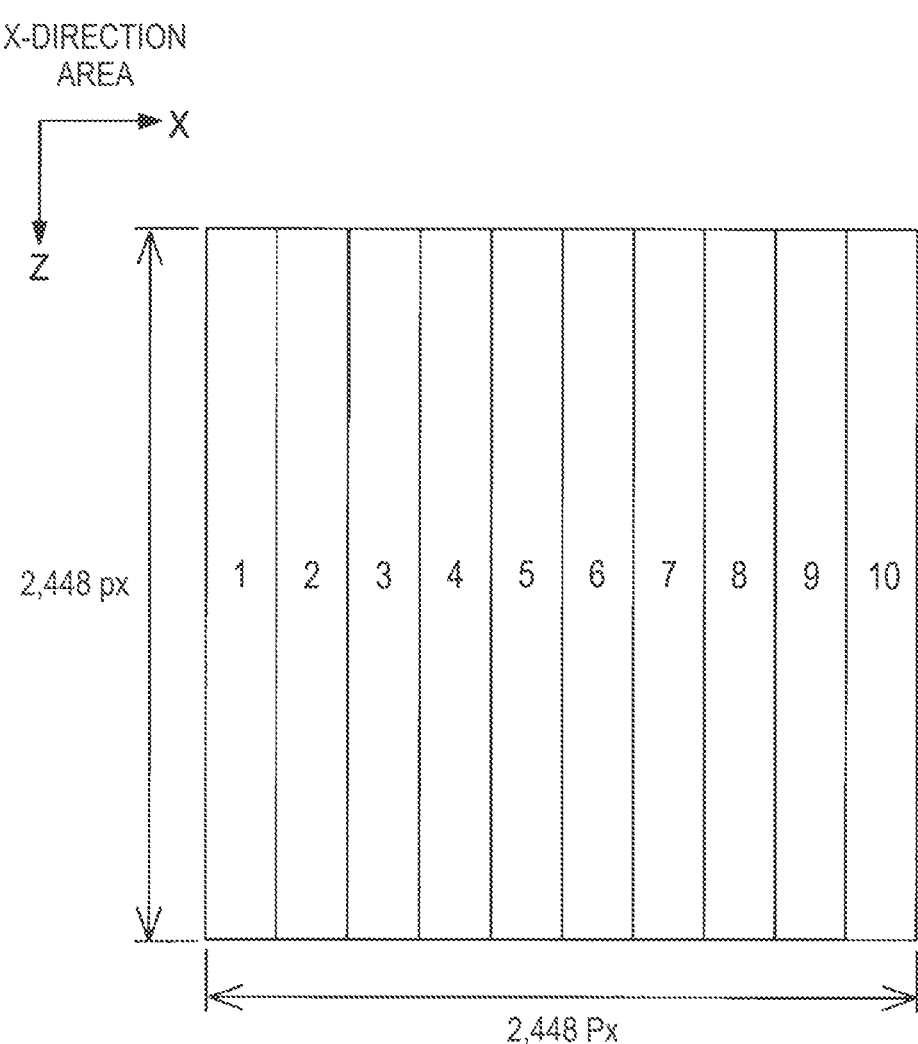

FIG. 9A shows an example correction map for correcting a movement amount in the X direction.

FIG. 9B shows an example correction map for correcting a movement amount in the X direction.

Figure 10A:
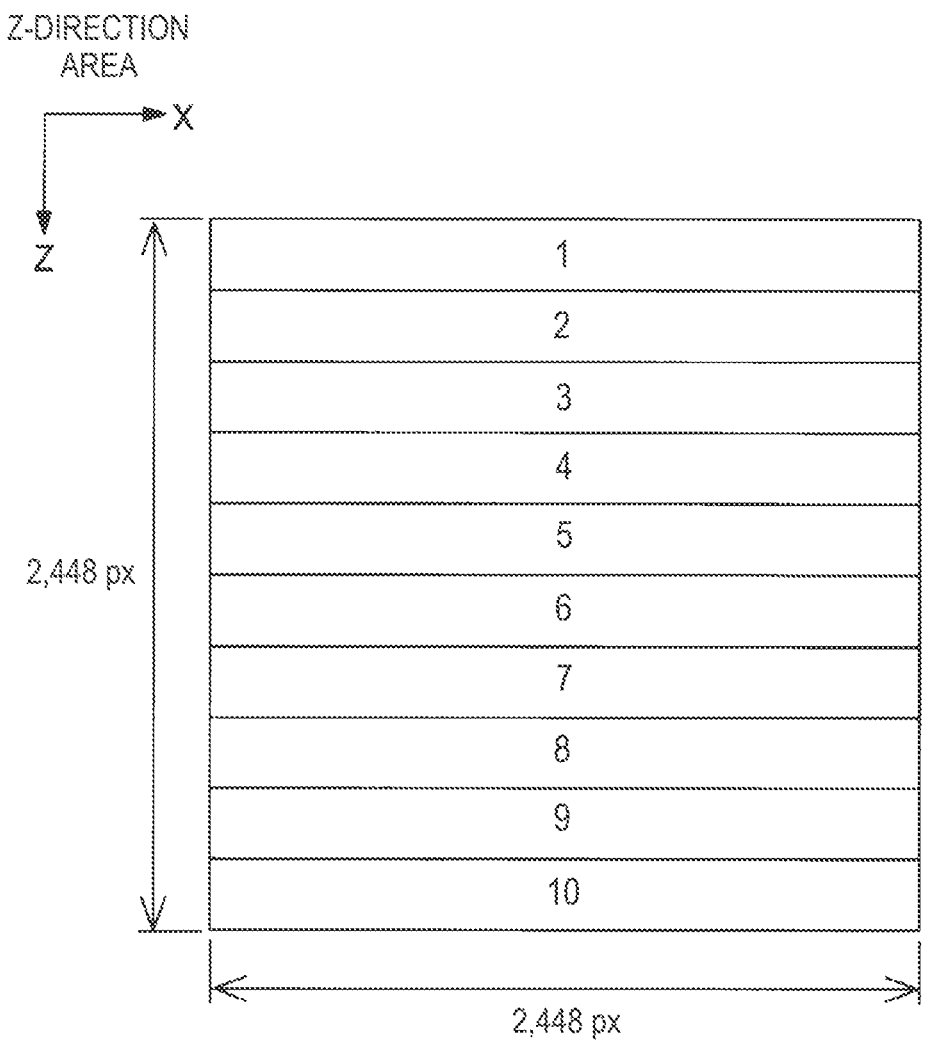

FIG. 10A shows an example correction map for correcting a movement amount in the Z direction.

FIG. 10B shows an example correction map for correcting a movement amount in the Z direction.

DESCRIPTION OF EMBODIMENT

An embodiment of the present invention will be hereinafter described with reference to the drawings. The embodiment described below is a preferred embodiment and the present invention is not limited to this example disclosure.
<Configuration of Particle Measuring Device>

Figure 1:
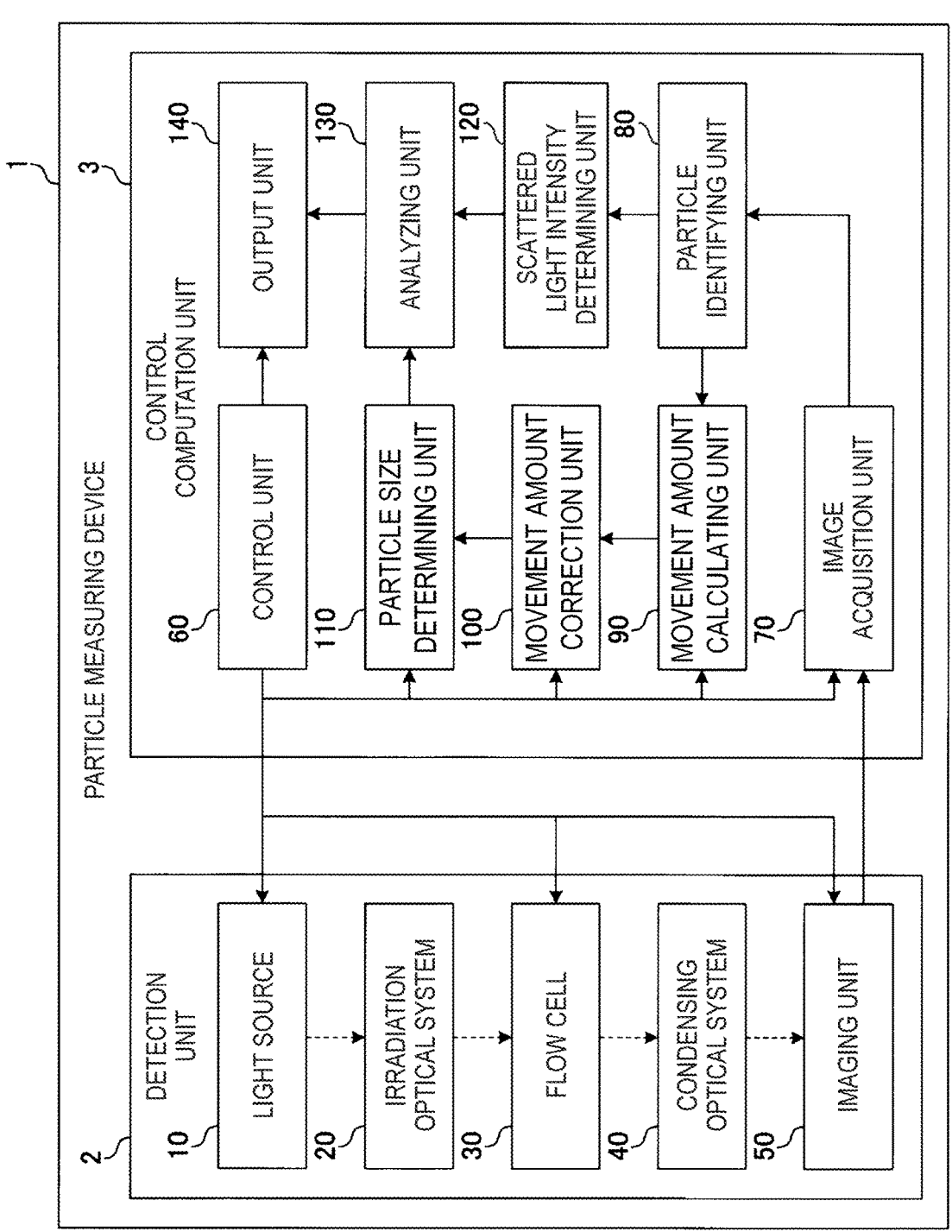
FIG. 1 is a block diagram showing the configuration of a particle measuring device according to one embodiment.

FIG. 1 is a block diagram showing the configuration of a particle measuring device 1 according to one embodiment.

The particle measuring device 1 is an FPT device and, as shown in FIG. 1, basically consists of a detection unit 2 and a control computation unit 3. Of these units, the detection unit 2 is a set of devices that serve to irradiate a sample which is a fluid with light and detect scattered light generated by interaction between a particle floating in the sample and the irradiation light. The control computation unit 3 is a set of devices that serve to control the individual devices constituting the detection unit 2 and, for example, determine a particle size by calculating movement amount of each particle on the basis of scattered light detected by the detection unit 2.
<Configuration of Detection Unit>

First, the configuration of the detection unit 2 will be described.

For example, the detection unit 2 includes a light source 10, an irradiation optical system 20, a flow cell 30, a condensing optical system 40, an imaging unit 50, etc. The light source 10, which is, for example, a semiconductor laser diode, emits irradiation light such as laser light. The irradiation optical system 20, which is, for example, a combination of a beam expander, a diffraction optical element, and optical slits, etc., shapes the irradiation light emitted from the light source 10 into a prescribed shape and condenses it at an inside position in the flow cell 30.

The flow cell 30 is made of a transparent material such as quartz or sapphire and is formed with, inside it, a flow passage into which a sample is caused to flow. When irradiation light enters the flow cell 30, a detection region is formed in the flow passage. The condensing optical system 40 (light receiving lens system), which includes, for example, optical lenses that are not telecentric lenses, and condenses light scattered from a particle passing through the detection region on the imaging unit 50. That is, the "detection region" is a region where the irradiation light and the region that is condensed on the imaging unit 50 by the condensing optical system 40 cross each other. The imaging unit 50 which is, for example, a camera equipped with an image sensor such as a CCD (charge-coupled device) or a CMOS (complementary metal-oxide-semiconductor) sensor, captures the scattered light condensed on the light-receiving surface of the image sensor by the condensing optical system 40.

Figure 2A:
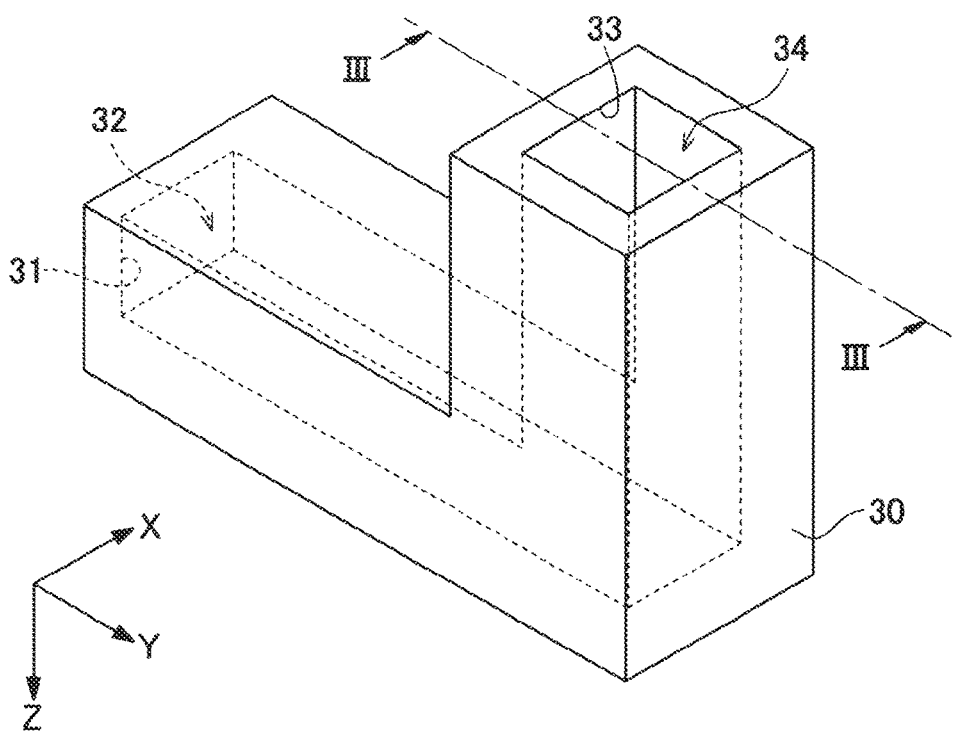
FIG. 2A is a view showing, in a simplified manner, the configuration of a detection unit employed in the one embodiment.
Figure 2B:
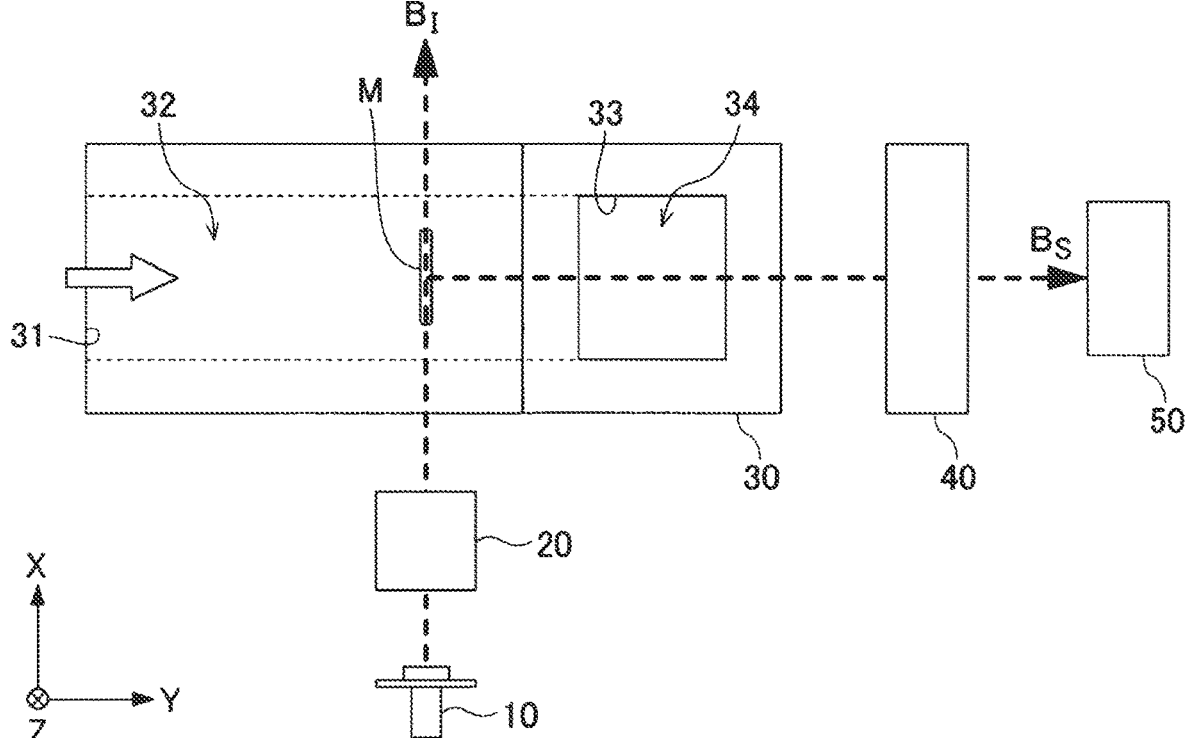
FIG. 2B is a view showing, in a simplified manner, the configuration of the detection unit employed in the one embodiment.

FIGS. 2A and 2B show, in a simplified manner, the configuration of the detection unit 2 employed in the one embodiment.

FIG. 2A is a perspective view of the flow cell 30. The flow cell 30 is shaped like a character "L" and is formed with, inside, an L-shaped a flow passage in which a first section 32 which extends from a first spread angle 31 in the Y direction and a second section 34 which extends from a second spread angle 33 in the Z direction communicate with each other at their respective ends. A sample is caused to flow into the first section 32 from the first spread angle 31, passes through the second section 34, and is ejected to the outside from the second spread angle 33. It suffices that the flow cell 30 have such a shape as to include a portion that is bent like a character "L" and may be shaped like a character "U" or a crank rather than a character "L."

FIG. 2B is a plan view showing, in a simplified manner, the configuration of the detection unit 2, in particular, positional relationships between individual units. The irradiation optical system 20 enters shaped irradiation light $B_I$ on the flow cell 30 from a direction (X direction) that is perpendicular to the sample flow direction (Y direction) in the first section 32. The condensing optical system 40 and the imaging unit 50 are disposed at positions that are opposed to a flow of the sample in the first section 32, that is, positions obtained by extending the first section 32 in the sample flow direction, and condense and capture light $B_S$ scattered from a particle that has passed through a detection region M. With this configuration, a movement of an individual particle in the XZ plane, that is, Brownian motion, is observed. How the scattered light $B_S$ is captured will be described in more detail using another drawing.

Figure 3:
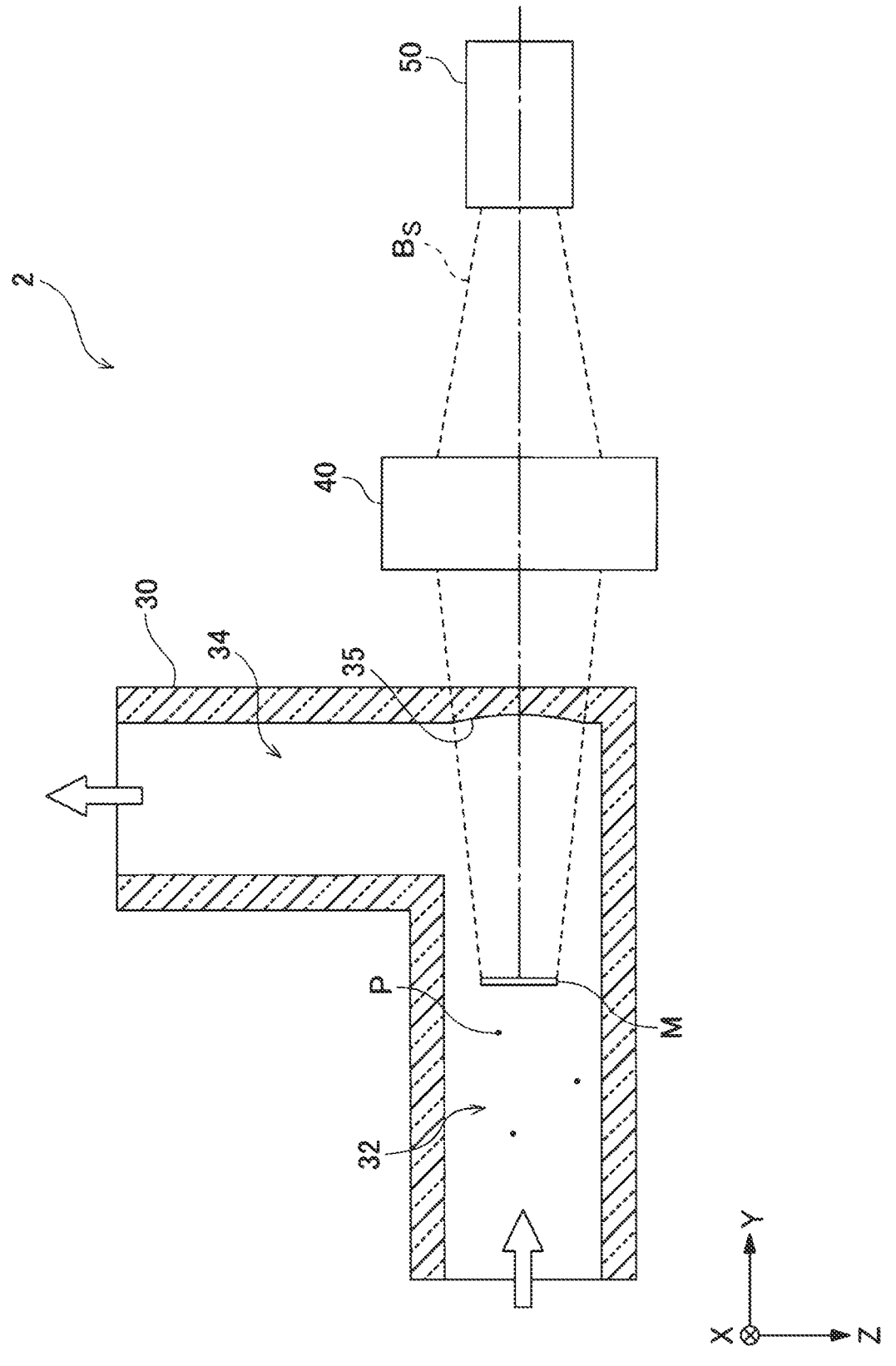
FIG. 3 is a vertical sectional view (a sectional view taken along a cutting line in FIG. 2A) showing, in a simplified manner, the configuration of the detection unit employed in the one embodiment.

FIG. 3 is a vertical sectional view (a sectional view taken along a III-III cutting line shown in FIG. 2A) showing, in a simplified manner, the configuration of the detection unit 2 employed in the one embodiment. The condensing optical system 40 and the imaging unit 50 are not shown in the form of cross sections.

As described above, shaped irradiation light $B_I$ enters on the flow cell 30 in the X direction and forms a detection region M in the first section 32. For example, the detection region M has a shape whose longer sides extend in the Z direction, shorter sides extend in the Y direction, and depth is approximately equal to the length of the longer sides and is in the X direction.

A portion, located between the detection region M and the condensing optical system 40, of the inner wall surface of the flow cell 30 is formed with a concave surface portion 35 that has a concave shape and whose radius of curvature is approximately equal to its distance from the center of the detection region M. When scattered light $B_S$ that has been generated from a particle P passing through the detection region M enters on the inner wall surface of the flow cell 30, the refraction of light may be occurred due to the difference between the refractive indices of a sample and the flow cell 30. However, the concave surface portion 35 can suppress the refraction of the scattered light $B_S$ entering on the inner wall surface of the flow cell 30.

The positions of the condensing optical system 40 and the imaging unit 50 with respect to the flow cell 30 are determined with the optical axis of the condensing optical system 40 as a reference line, and the individual units are disposed so that the optical axis of the condensing optical system 40 passes through the center of the detection region M, the center of the concave surface portion 35, and the center of the light receiving surface of the image sensor of the imaging unit 50. The imaging unit 50, which is opposed to an XZ plane, observes movement of scattered light generated in the detection region M, that is, Brownian motion of each particle P passing through the detection region M, and captures a moving image having a prescribed frame rate.

As described above, since the condensing optical system 40 and the imaging unit 50 are disposed at such positions as to be opposed to a sample flow in the first section 32, movement of scattered light (Brownian motion of each particle P) can be observed.

<Configuration of Control Computation Unit: see FIG. 1>

Next, the configuration of the control computation unit 3 will be described.

For example, the control computation unit 3 includes a control unit 60, an image acquisition unit 70, a particle identifying unit 80, a movement amount calculating unit 90, a movement amount correction unit 100, a particle size determining unit 110, a scattered light intensity determining unit 120, an analyzing unit 130, an output unit 140, etc. The control unit 60 controls the operations of the individual units of the detection unit 2 and a series of processing performed in the control computation unit 3. For example, the control unit 60 controls the emission/non-emission of irradiation light by the light source 10, the flow velocity (flow rate) of a sample to be caused to flow into the flow cell 30, and the capturing a moving image by the imaging unit 50. Alternatively, a unit for controlling all or part of the series of processing may be provided separately from the control unit 60 and such controls may be performed by that unit. For example, the flow velocity of a sample may be controlled by a flow rate control device such as a mass flow controller provided separately from the control unit 60.

The image acquisition unit 70 acquire a still image of each frame (frame image) from a captured moving image by the imaging unit 50 at a prescribed frame rate. The frame rate of a moving image and the flow velocity of a sample are controlled so that a prescribed number of frame images can be acquired for each particle from a captured moving image. For example, where the length of the detection region M in the Y direction is 20 μm and in order to acquire 10 frame images from a captured moving image at 30 fps (i.e., 30 times per second), the flow velocity of a sample is set at 60 μm/s.

The particle identifying unit 80 determines a particle from a frame image acquired by the image acquisition unit 70, correlates particles captured in consecutive frame images, and determines their locus.

The movement amount calculating unit 90 calculates, for each frame image, movement amount, in the two-dimensional directions (X direction and Z direction), of the particle due to Brownian motion identified by the particle identifying unit 80. Representative values of a position of a particle are used in determining a locus of a particle or calculating movement amount of a particle. A position of a particle is determined by, for example, the centroid or the center position of the particle.

With respect to the calculated movement amount of the particle calculated by the movement amount calculating unit 90, the movement amount correction unit 100 corrects for errors of movement amount caused by a magnification variation that depends on the defocus positions, by using correction values determined in a correction map that is prepared in advance.

The particle size determining unit 110 determines a particle size corresponding to a diffusion coefficient of each particle, on the basis of movement amount corrected by the movement amount correction unit 100. Specific methods for calculating and correcting movement amount of a particle and determining a particle size will be described in detail with reference to other drawings.

The scattering light intensity determining unit 120 determines a scattered light intensity of each particle being traced. More specifically, the scattering light intensity determining unit 120 determines a scattered light intensity-correspondent value of the particle using a luminance average value, a maximum luminance value, a binarization area, etc. of the same particle that are obtained on the basis of image information that is sent when a particle has been identified by the particle identifying unit 80.

The analyzing unit 130 calculates density of particles for each prescribed particle size range, on the basis of the particle size determined by the particle size determining unit 110. The analyzing unit 130 analyzes a refractive index of each particle on the basis of the particle size determined by the particle size determining unit 110 and the scattered light intensity-correspondent value determined by the scattering light intensity determining unit 120. More specifically, the analyzing unit 130 determines a refractive index of a target particle on the basis of relationships of the relative scattered light intensity with respect to the known refractive index and the known particle size that were obtained in advance using sample particles whose particle size is known and can generally be regarded as a single particle size, such as polystyrene latex particles. Alternatively, the analyzing unit 130 discriminates between a solid particle and an air bubble on the basis of differences between refractive indices.

The output unit 140 outputs a result of the analysis performed by the analyzing unit 130. The output unit 140 can output an analysis result in various manners such as display on the screen, output to a printer, output to a storage unit (not shown), and transmission to another device over a network.

<How Particles are Seen at the Time of Detection>

Figure 4:
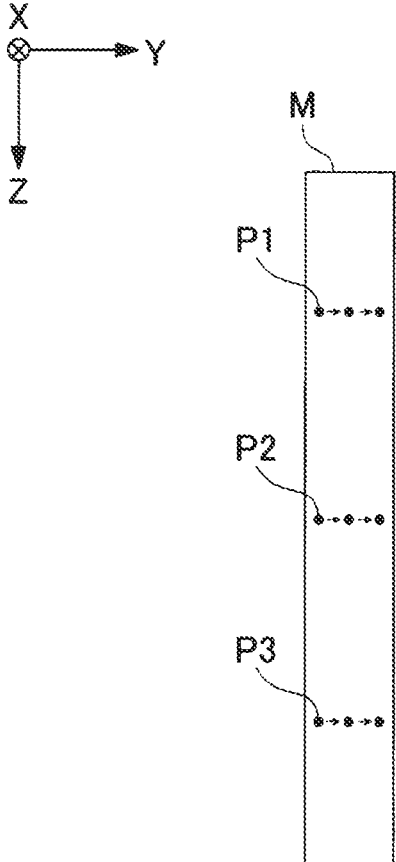
FIG. 4 is a diagram illustrating how movements of particles are seen in a detection region.
Figure 5:
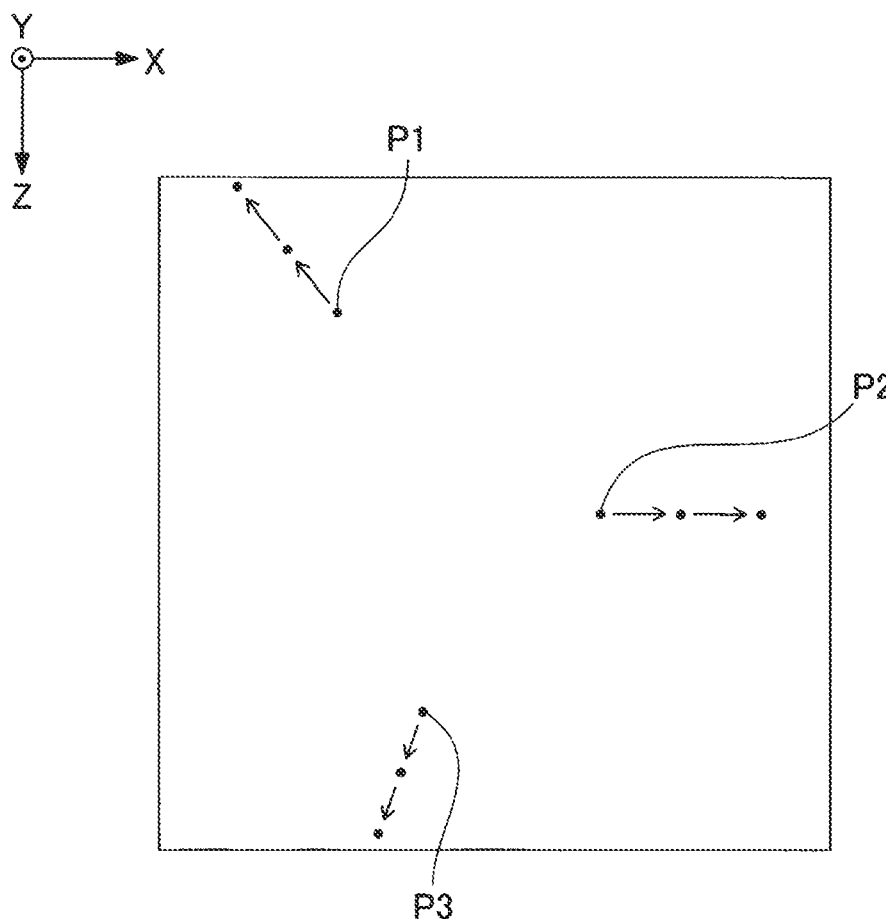
FIG. 5 is a diagram illustrating how movements of particles appear on the light receiving surface of an image sensor.

FIGS. 4 and 5 are diagrams illustrating how particles are seen at the time of detection. More specifically, FIG. 4 shows how particles are seen in the case where the detection region M is observed from a direction that is perpendicular to the sample flow direction, that is, how particles are seen in the YZ plane. FIG. 5 shows how particles appear when their images are formed on the light receiving surface of the image sensor in the imaging unit 50, that is, how particles are seen in the XZ plane.

As described above, in the embodiment, the condensing optical system 40 and the imaging unit 50 are disposed at such positions as to be opposed to a sample flow and the focal point is moved by defocusing of the condensing optical system 40 as particles move. That is, since the magnification varies according to the position of a particle in the Y direction, a difference occurs in the image height in each captured frame image. Furthermore, as shown in FIG. 4, even if particles P1, P2, and P3 are moving parallel with the Y direction, the particles P1, P2, and P3 are seen as if they were moving outward away from the center of the detection region M in the XZ plane due to magnification changes caused with defocus positions, as shown in FIG. 5. An image of light scattered from each particle that appears in this manner is formed on the light receiving surface.

<Errors Caused by Defocusing>

Figure 6A:
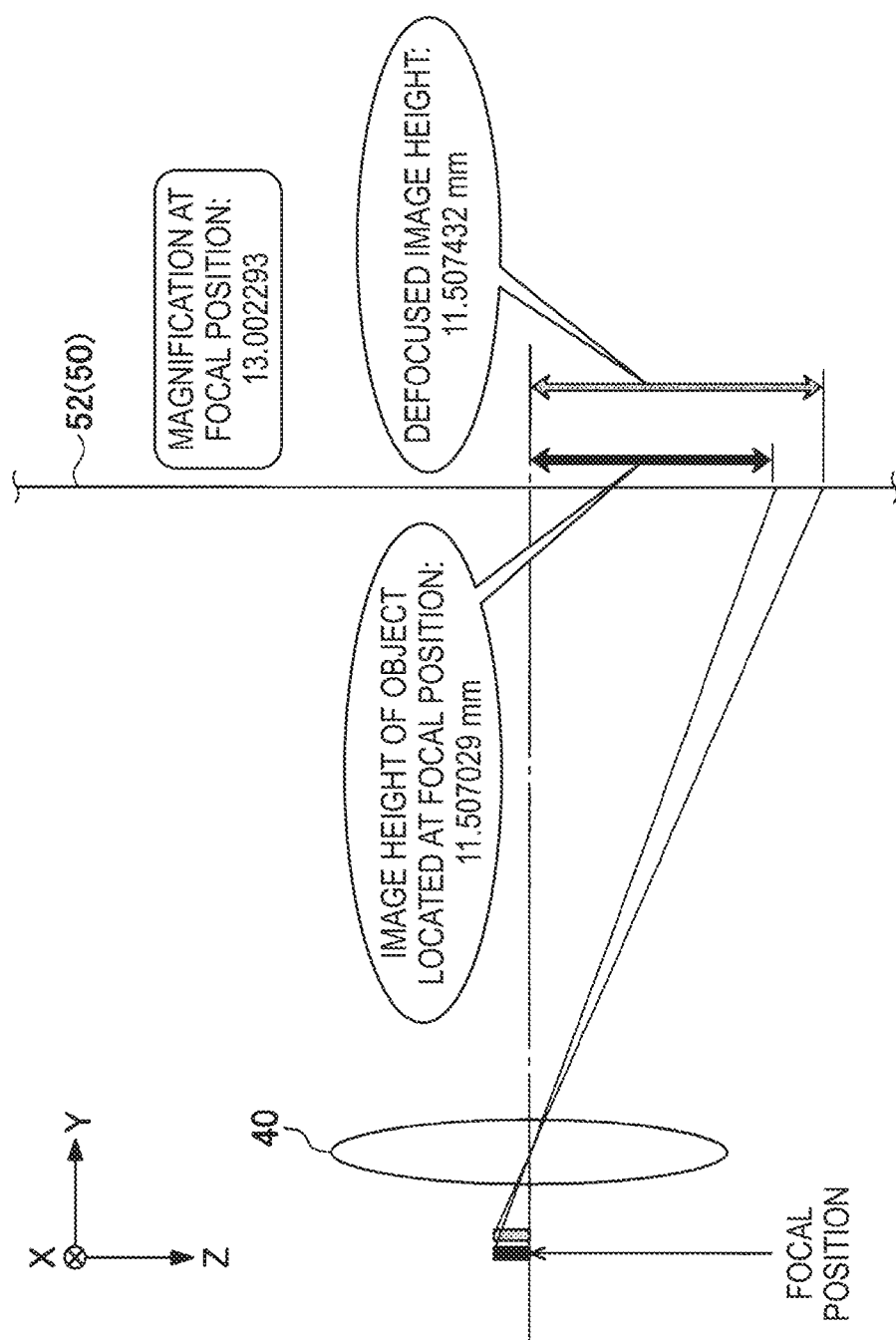
FIG. 6A is a diagram illustrating errors of particle size caused by defocusing.
Figure 6B:
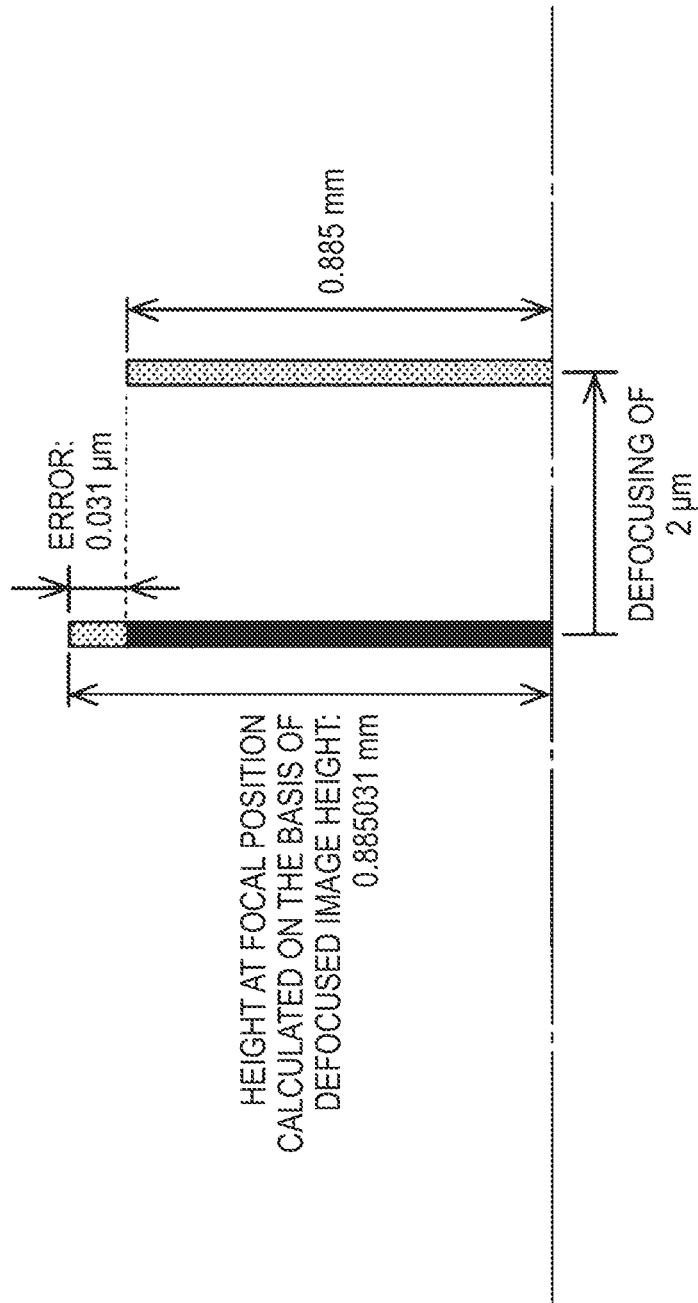
FIG. 6B is a diagram illustrating errors of particle size caused by defocusing.

FIGS. 6A and 6B are diagrams illustrating errors of particle size caused by defocusing.

The magnification, at the focal position, of the condensing optical system 40 of the embodiment shown in FIG. 6A is 13.002293. For example, when an object having an object height 0.885 mm is located at the focal position in the detection region, the image height formed on the light receiving surface 52 of the imaging unit 50 becomes 11.507029 mm. When this object is moved by 2 μm in the sample flow direction (Y direction) so as to be located at a defocus position (that is closer to the condensing optical system 40), the image height on the light receiving surface 52 becomes 11.507432 mm.

An object height that is calculated from the defocused image height shown in FIG. 6B with an assumption that the object is located at the focal position (defocused image height/magnification at focal position) is 0.885031 mm. That is, the result of the calculation that is based on the defocused image height means that the object having the object height 0.885031 mm should exist at the focal position, which means an error (error of movement amount) of 0.031 μm from the actual object height 0.885 mm occurs. If a movement amount of a particle due to Brownian motion is calculated without taking an error of object height due to defocusing into consideration, the error affects a determination of a particle size of the particle.

Thus, in the embodiment, a calculation error of a particle movement amount resulting from a magnification variation due to defocusing is corrected by using a predetermined magnification calibration curve with respect to the defocus position, with utilizing the fact that a particle necessarily approaches the condensing optical system 40 from far away (i.e., it is transported from a distant position to a near position by a sample flow).

Figure 7:
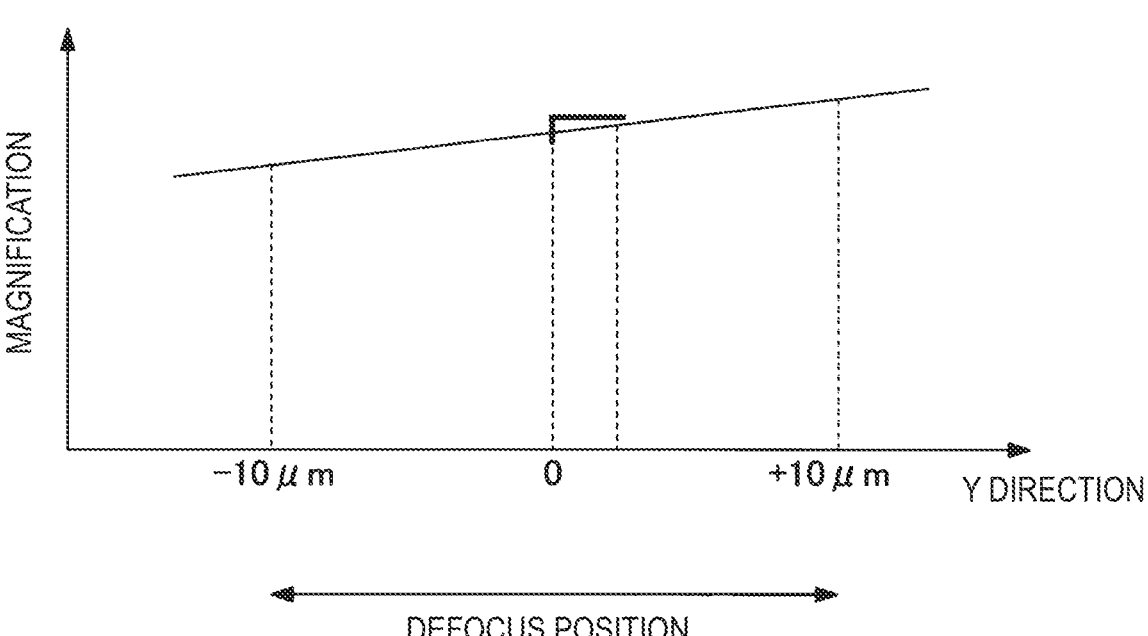
FIG. 7 is a graph showing a magnification calibration curve with respect to the defocus position.

FIG. 7 is a graph showing a magnification calibration curve with respect to the defocus position.

In the embodiment, it is assumed that the flow velocity of a sample that is caused to flow into the flow cell 30 is constant and the calibration curve is a linear function of the distance in the Y direction. Assuming that the calibration curve is a linear function makes it possible to correct an error at a fixed interval due to defocusing as a constant amount irrespective of the defocus position.

Next, a movement amount calculation method and correction method will be described.

FIG. 8 is a diagram showing pixels on the light receiving surface 52. The light receiving surface 52 includes, for example, 2,448 pixels (px) in each of the horizontal direction (X direction) and the vertical direction (Z direction). And the light receiving surface 52 detects light that has been generated in the detection region in the plane that is opposed to the XZ plane. A light scattered by a particle in the XZ plane is formed in the light receiving surface 52, whereby Brownian motion of the particle is captured by the imaging unit 50 as a moving image.

<Calculation of Movement Amount>

When a frame image is acquired from a captured moving image by the image acquisition unit 70, at first, the particle identifying unit 80 identifies a particle from the frame image acquired from the moving image and obtains a centroid coordinates "$(x_i, z_i)$" of the particle in each frame image. Where "$x_i$" is an X coordinate in a frame image of an ith frame and "$z_i$" is a Z coordinate in the frame image of the ith frame.

Then the movement amount calculating unit 90 determines a locus of the particle and calculates movement amount of the particle in the X direction and Z direction between each consecutive frame on the basis of the sets of centroid coordinates of the particle in the respective frame images. More specifically, the movement amount calculating unit 90 calculates a movement amount (μm) of the particle in the X direction between an ith frame and an i+1th frame according to an equation "$x_{i+1} - x_i$" and calculates a movement amount (μm) of the particle in the Z direction between the ith frame and an i+1th frame according to an equation "$z_{i+1} - z_i$." That is, movement amount of the particle in the X direction and the Z direction are an X component and a Z component from resolution of a vector indicating a locus of a centroid position in the frame to a centroid position in an i+1th frame in the XZ plane.

<Correction of Movement Amount>

When respective movement amount of the particle in the X direction and the Y direction are calculated by the movement amount calculating unit 90, then the movement amount correction unit 100 acquires correction values corresponding to the set of centroid coordinates of the particle by referring to a correction map prepared in advance, and corrects the movement amount of the particle in the X direction and the Z direction calculated by the movement amount calculating unit 90 with using the acquired respective correction values according to the following calculation equations:

<Equation 1>

$$\Delta x_{(i)}=(x_{i+1}-x_i)-v_{x(xi,zi)}\Delta t \tag{1}$$

$$\Delta z_{(i)}=(z_{i+1}-z_i)-v_{z(xi,zi)}\Delta t \tag{2}$$

In the above calculation equation (1), $\Delta x_{(i)}$ is a corrected movement amount (μm) in the X direction. In the above calculation equation (2), $\Delta z_{(i)}$ is a corrected movement amount (μm) in the Z direction. In calculation equations (1) and (2), $\Delta t$ is the reciprocal of a frame rate, that is, a time interval (s) determined by the frame rate of the moving image.

That is, "$v_{x(xi, zi)}\Delta t$" and "$v_{z(xi, zi)}\Delta t$" are errors of movement amount between frames caused by magnification changes corresponding to the centroid coordinates of the particle in the XZ plane. In these terms, "$v_{x(xi, zi)}$" and "$v_{z(xi, zi)}$" are correction values (μm/s) that were obtained in advance on the basis of an X direction component and a Z direction component of an apparent movement velocity. Defining correction values as a movement velocity makes it possible to correct a movement amount using the same calculation equations even if the frame rate is changed.

Since the correction values depend on the object height, it is necessary to prepare, in advance, a correction map on the basis of predetermined correction values corresponding to each object height. In the embodiment, correction values corresponding to an error amount for an object height assumed in advance (for example, 0.031 μm for an object height 0.885 mm, described above) were calculated in advance using optical simulation software, and a correction map corresponding to this object height was prepared. An aspect of the correction map will be described further with reference to other drawings.

<Determination of Particle Size>

When movement amount of each particle in the X direction and the Z direction are corrected by the movement amount correction unit 100, then the particle size determining unit 110 determines a particle size of each particle on the basis of corrected movement amount. More specifically, at first, the particle size determining unit 110 calculates an average movement amount $L_R$ on the basis of each corrected movement amount in the X direction and the Z direction according to the following calculation equation:

< Equation 2 >

$$L_R = \sqrt{\frac{1}{M}\sum_{i=1}^{M}(\Delta x_{(i)}^2 + \Delta z_{(i)}^2)} \tag{3}$$

In the above calculation equation (3), "$L_R$" is the average movement amount (μm) per frame (i.e., between consecutive frames), "i" is the frame number, and "M" is the number of movement amount obtained from frame images. For example, where M=10, frame numbers are 1 to 11 and hence movement amount of the particle is calculated on the basis of 11 frame images. Thus, the number of movement amount calculated from these frame images is equal to 10.

Subsequently, the particle size determining unit 110 calculates a diffusion coefficient D according to the following calculation equation:

<Equation 3>

$$D=L_R/(4·t) \tag{4}$$

Finally, the particle size determining unit 110 determines a particle size d according to the following Stokes-Einstein equation:

<Equation 4>

$$d=kB·T/(3\pi·\eta·D) \tag{5}$$

In the above calculation equation (5), "kB" is the Boltzmann constant, "T" is the absolute temperature, and "η" is the viscosity coefficient of the sample.

<Effects of Correction>

An average movement amount $L_R$ of a particle due to Brownian motion having a particle size 100 nm in a case that the time interval $\Delta t$ that is determined by the frame rate is $\frac{1}{120}$ s (the frame rate is 120 fps), the absolute temperature T is 293.2 K, and the viscosity η is 0.001 Pa·s is calculated to be 0.378 μm according to the above calculation equations (4) and (5).

Now as described above with reference to FIGS. 6A and 6B, it is assumed that an error of movement amount of 0.031 μm has occurred. Then an average movement amount that is calculated without correcting movement amount would be 0.409 μm which is the above average movement amount $L_R$ 0.378 μm plus the error of movement amount 0.031 μm. In this case, the particle size d is determined to be 85 nm according to the above calculation equation (5). That is, where the movement amount contains the error, the particle size is determined with an error that is as large as 15 nm though the actual particle size of the particle is 100 nm.

In contrast, in the embodiment, the magnification error due to defocusing is corrected because movement amounts of the particle are corrected using the correction values determined in advance. As a result, according to the embodiment, a movement amount of a particle can be obtained correctly and the measurement accuracy of a particle size can be improved.

<Correction Map>

Next, the correction map will be described.

The correction map is an object of arranging correction values for correcting a magnification error due to defocusing that were obtained in advance for respective object heights. Since the correction values vary depending on the position on the observation surface, correction values are determined for each of pixels or sections arranged in the X coordinate direction and the Z coordinate direction on the light receiving surface. In the embodiment, as described above, correction values are calculated for each of predetermined object heights by optical simulation software and a correction map corresponding to each object height is prepared in advance.

FIGS. 9A to 10B are tables showing correction maps that were prepared in advance. Among these figures, FIGS. 9A and 9B show example correction maps (correction maps in the X direction) for correcting a movement amount in the X direction. FIGS. 10A and 10B show example correction maps (correction maps in the Z direction) for correcting a movement amount in the Z direction.

In each of correction maps, correction values were obtained in advance on the basis of an X direction component and a Z direction component of an apparent movement velocity. For example, it is assumed that the frame rate is 120 fps and a particle passes through a section of the defocus position being −10 μm to +10 μm in the detection region at a velocity of 2 μm per frame ($\frac{1}{120}$ s=8.333 ms). In this case, as described above with reference to FIGS. 6A and 6B, when the object height is 0.885 mm, a movement amount is detected with an error 0.031 μm due to defocusing of 2 μm. That is, since an error per frame is 0.031 μm, an error velocity can be expressed as 3.72 μm/s (=0.031 μm/8.333 ms). This value of the velocity is the same on a concentric circle from the center of the detection region, and the value of each component decomposed into the X direction and the Z direction according to the position of the coordinates is defined as a correction value in each correction map. That is, in each correction map, a value expressing an error amount obtained in advance in units of velocity according to the position of the coordinates is defined.

Although the above description is directed to the example case of an object height being 0.885 mm, errors are calculated for other various object heights and two-dimensional correction maps in the X direction and Z direction are prepared.

Although. the best way is to set correction values for respective pixels on the light receiving surface, they may be set for respective prescribed sections to, for example, simplify the calculation processing. For example, in the X direction correction map shown in FIG. 9A, a detection region is divided approximately equally into 10 areas in the X direction. Furthermore, X coordinate ranges for the respective areas and correction values that are used when the detection region is in the respective X coordinate ranges are determined as shown in FIG. 9B. When the X direction correction map is referred to, a related area is selected according to only an X coordinate position irrespective of a Z coordinate position and a correction value corresponding to that area is used.

In the Z direction correction map shown in FIG. 10A, a detection region is divided approximately equally into 10 areas in the Z direction. Furthermore, Z coordinate ranges for the respective areas and correction values that are used when the detection region is in the respective Z coordinate ranges are determined as shown in FIG. 10B. When the Z direction correction map is referred to, a related area is selected according to only a Z coordinate position irrespective of an X coordinate position and a correction value corresponding to that area is used.

For example, it is assumed that the centroid of an observed particle is located at a position of (xi, zi)=(2,448, 1) among 2,448×2,448 pixels shown in FIG. 8. If the X direction correction map shown in FIGS. 9A and 9B is referred to, it is seen that the above X coordinate corresponds to "area 10." Thus, a correction value "3.359493" is used for the movement amount in the X direction before correction and a corrected movement amount in the X direction, Δx(i), is calculated. If the Z direction correction map shown in FIGS. 10A and 10B is referred to, it is seen that the above Z coordinate corresponds to "area 1." Thus, a correction value "−3.359493" is used for the movement amount in the Z direction before correction and a corrected movement amount in the Z direction, Δz(i), is calculated.

The division states of area in the correction maps shown in FIGS. 9A to 10B are just examples and the present invention is not limited to these. For example, area may be subdivided more finely (e.g., every 10 px) or correction values may be determined for all individual pixels instead of making area division if there is enough room for calculation. In either case, since each correction value varies depending on the object height, it is necessary to prepare, in advance, a correction map for each object height range.

Incidentally, it is conceivable to employ a method of obtaining error amount by an actual measurement instead of performing an optical simulation. However, where error amount is obtained by an actual measurement, since there exist causes of errors other than the magnification of the optical system (e.g., a sample flow velocity), it is necessary to distinguish those other causes from the magnification, but it is expected that distinguishing those causes is difficult. In contrast, in the embodiment, since error amount is calculated by an optical simulation, it is not necessary to take other causes of errors into consideration and only error amount relating to the errors caused from optical system can be obtained.

Advantages of Invention

As described above, the above-described embodiment provides the following advantages.

(1) Since a movement amount of a particle is corrected using a predetermined correction value, a movement amount of a particle can be obtained more correctly by correcting for a magnification error due to defocusing. This makes it possible to improve the particle size measurement accuracy.

(2) Since correction values are defined as movement velocity, even in a case that a measurement is performed with a change of the frame rate of a moving image to be captured, a movement amount can be corrected using the same correction values as before a frame rate change.

(3) Since it is assumed that a calibration curve with respect to the defocus position is a linear function of the distance, a movement amount can be corrected with the assumption that an error in a fixed interval due to defocusing is constant irrespective of the defocus position.

(4) Since magnification errors due to defocusing can be corrected, it is not necessary to construct the condensing optical system 40 using telecentric optical lenses, and thus the degree of freedom of designing the condensing optical system 40 is improved.

The present invention can be implemented being modified in various manners without being restricted by the above-described embodiment.

Although in the above-described embodiment the irradiation optical system 20 is configured as a combination of a beam expander, a diffraction optical element, and optical slits, etc., the present invention is not limited to this case. For example, the irradiation optical system 20 may be configured as a combination of plural optical lenses.

In the above-described embodiment, irradiation light $B_I$ is caused to enter the first section 32 from the X direction. Instead, irradiation light $B_I$ may be caused to enter the first section 32 from the Z direction.

Although in the above-described embodiment, a sample is introduced into the flow cell 30 so as to flow from the first spread angle 31 to the second spread angle 33, the present invention is not limited to this case. A sample may be introduced into the flow cell 30 so as to flow from the second spread angle 33 to the first spread angle 31. Furthermore, an introduction of the sample into the flow cell may be performed by pressure feeding the sample into a spread angle serving as an inlet. Alternatively, an introduction of the sample into the flow cell may be performed by sucking the sample from a spread angle serving as an outlet.

As for other things, the example materials, numerical values, etc. employed above as of the individual units or components of the particle measuring device 1 are just examples and it goes without saying that they may be changed as appropriate in practicing the invention.

The present application is based on Japanese Patent Application No. 2020-046243 filed on Mar. 17, 2020, the disclosure of which is incorporated herein by reference.

REFERENCE SIGNS LIST

1: Particle measuring device
2: Detection unit
3: Control computation unit
10: Light source
20: Irradiation optical system
30: Flow cell
40: Condensing optical system
50: Imaging unit
52: Light receiving surface
60: Control unit
70: Image acquisition unit
80: Particle identifying unit
90: Movement amount calculating unit
100: Movement amount correction unit
110: Particle size determining unit
120: Scattered light intensity determining unit
130: Analyzing unit
140: Output unit

The invention claimed is:

1. A particle measuring method comprising:
irradiating a sample flowing through a flow passage with irradiation light;
condensing light scattered from a particle contained in the sample passing through a detection region that is formed in a prescribed section of the flow passage by irradiation with the irradiation light, at a position obtained by extending the prescribed section in a flow direction of the sample;
capturing, by a camera, the condensed scattered light at a prescribed frame rate;
calculating movement amount of the particle due to Brownian motion in two-dimensional directions on a basis of captured plural frame images;
correcting the calculated movement amount using correction values that were obtained in advance so as to correspond to each of defocus positions of frame images captured the condensed scattered light to correct for a magnification error that occurs due to defocusing at condensing the scattered light;
determining a particle size of the particle on the basis of the corrected movement amount;
outputting a result of the determination of the particle size to one of a display screen, a printer, a storage unit, and a network, wherein the correcting the calculated movement amount comprises using a correction map that stores the correction values corresponding to respective positions on a light receiving surface of the camera, and
wherein the correction values are obtained by optical simulation software that calculates magnification errors for predetermined object heights at different defocus positions in the flow direction.

2. The particle measuring method according to claim 1, implement by a particle measuring device that comprises:
a flow cell having the flow passage inside;
a light source which emits the irradiation light;
an irradiation optical system which irradiates the sample flowing through the flow passage with the irradiation light;
a condensing optical system which condenses light scattered from the particle contained in the sample passing through the detection region that is formed in the prescribed section of the flow passage by irradiation with the irradiation light, at a position downstream of the prescribed section in the flow direction of the sample; and
the camera which captures condensed scattered light at the prescribed frame rate.

3. The particle measuring method according to claim 1, wherein the correction values are expressed in a unit of velocity.

4. A correction method of a particle measuring device which condenses light scattered from a particle contained in a sample passing through a detection region that is formed in a prescribed section of a flow passage by irradiation with irradiation light, at a position obtained by extending the prescribed section in a flow direction of the sample, and captures, by a camera, the scattered light at a prescribed frame rate, and which calculates movement amount of the particle due to Brownian motion in two-dimensional directions on a basis of captured plural frame images, and determines a particle size, the correction method comprising:
correcting the movement amount using correction values to correct for a magnification error that occurs due to defocusing at the condensing the scattered light, where the correction values being obtained in advance so as to correspond to each of defocus positions of the captured frame images;
determining a particle size of the particle on the basis of the corrected movement amount;
outputting a result of the determination of the particle size to one of a display screen, a printer, a storage unit, and a network,
wherein the correcting the calculated movement amount comprises using a correction map that stores the correction values corresponding to respective positions on a light receiving surface of the camera, and
wherein the correction values are obtained by optical simulation software that calculates magnification errors for predetermined object heights at different defocus positions in the flow direction.

* * * * *